United States Patent
Nakajima et al.

(10) Patent No.: US 8,809,726 B2
(45) Date of Patent: Aug. 19, 2014

(54) ELECTRODE TIP MAGAZINE FOR SPOT WELDER

(75) Inventors: Toshio Nakajima, Kuwana (JP); Takeo Fukizawa, Kitanagoya (JP)

(73) Assignee: Shinkokiki Co., Ltd., Nagoya-Shi (JP)

( * ) Notice: Subject to any disclaimer, the term of this patent is extended or adjusted under 35 U.S.C. 154(b) by 593 days.

(21) Appl. No.: 12/707,716

(22) Filed: Feb. 18, 2010

(65) Prior Publication Data

US 2010/0147806 A1    Jun. 17, 2010

Related U.S. Application Data

(63) Continuation of application No. PCT/JP2007/000983, filed on Sep. 10, 2007.

(51) Int. Cl.
*B23K 9/28* (2006.01)
*B23K 11/30* (2006.01)

(52) U.S. Cl.
CPC ................... *B23K 11/3072* (2013.01)
USPC ....................... 219/86.25; 219/86.8

(58) Field of Classification Search
USPC ......... 29/281.1, 700, 759, 760; 269/903, 291, 269/295, 309–310; 248/279.1, 287.1, 248/346.07, 657, 662; 74/606 R, 74/813 R–813 L; 219/86.25, 86.8; 221/244, 221/279

See application file for complete search history.

(56) References Cited

U.S. PATENT DOCUMENTS

| | | | | |
|---|---|---|---|---|
| H164 | H | * 11/1986 | Savioli | .................... 89/33.02 |
| 6,241,121 | B1 | * 6/2001 | Yasaka | ..................... 221/226 |
| 2005/0023250 | A1 | * 2/2005 | Izumi et al. | ............... 219/86.8 |

FOREIGN PATENT DOCUMENTS

| | | |
|---|---|---|
| JP | 05-245653 A1 | 9/1993 |
| JP | 05-088779 U1 | 12/1993 |
| JP | 07-047478 A1 | 2/1995 |
| JP | 2005-046888 A1 | 2/2005 |
| JP | 2006-068787 | 3/2006 |
| JP | 2006068787 A * | 3/2006 |

* cited by examiner

*Primary Examiner* — Tu Hoang
*Assistant Examiner* — Thien S Tran
(74) *Attorney, Agent, or Firm* — Burr & Brown, PLLC

(57) ABSTRACT

An electrode tip magazine for a spot welder that does not interfere with the welding gun is provided. The magazine includes a magazine body formed with a storage part slidably aligning and storing a plurality of electrode tips therein, one end of this storage part serving as an externally opened supply port, a push-out member disposed to be freely slidable between both ends inside the storage part, a pulley disposed at a position adjacent to the supply port of the magazine body, a spiral spring disposed at a position at the other end of the storage part of the magazine body, and a wire connecting a distal end of the spiral spring and the push-out member with an intermediate portion thereof being wound around the pulley so as to always pull the push-out member toward the supply port by a biasing force of the spiral spring.

8 Claims, 25 Drawing Sheets

15
A-A cross-section

15
C-C cross-section

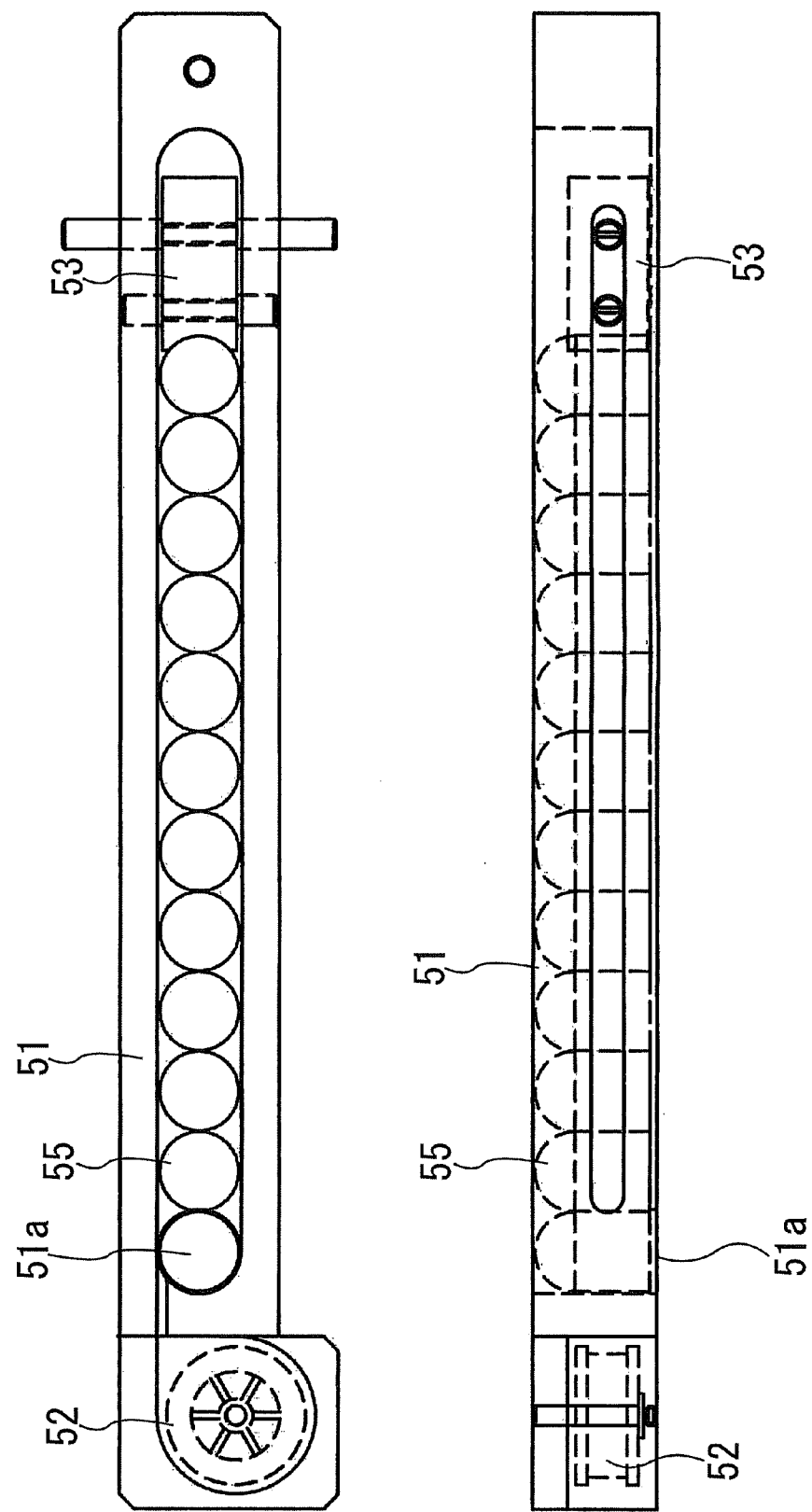

ELECTRODE TIP MAGAZINE FOR SPOT WELDER

FIELD OF THE INVENTION

The present invention relates to an electrode tip magazine for a spot welder, which stores a plurality of electrode tips such that the electrode tips are supplied one by one to a supply port.

BACKGROUND OF THE INVENTION

Conventionally, spot welding has been widely used as one means of welding body workpieces of cars, wherein, with electrode tips attached to a welding gun making pressure contact with the workpieces, electric current is applied, so as to melt and fuse the metal with the resistance heat. Performing the spot welding for a long time causes the electrode tips to suffer deformation and wear of the tip shape, making it harder to secure required welding quality. Therefore, it has been the practice that, when a certain amount of processing time or a certain number of welding points is exceeded, the electrode tips are removed from the welding gun and replaced with new electrode tips, so as to secure a good tip shape of the electrode tips.

Recently, many of the materials to be welded together are provided with rust proof treatment or the like using chemicals, because of which electrode tips tend to wear more quickly and need to be replaced more frequently. However, stopping the welding process line each time for the operator to change the electrode tips would lower the production efficiency. Therefore, it has been the practice to install an electrode tip mounting/dismounting apparatus on the welding process line and to move a robot arm so as to move the welding gun attached to the robot arm to a position where the electrode tip mounting/dismounting apparatus is installed, so that the electrode tips of the welding gun are changed by means of the electrode tip mounting/dismounting apparatus. This electrode tip mounting/dismounting apparatus is constituted by an electrode tip removing apparatus that removes the electrode tips from the welding gun, and an electrode tip magazine that stores a plurality of electrode tips. In the conventional structure, the electrode tip magazine stores a plurality of electrode tips in the up and down direction such that they are biased by a coil spring thereby to be supplied one by one to supply ports that open to the upper side and the underside. However, one problem was that, the biasing force of coil springs was not constant depending on the compression strength, i.e., the coil spring would exert a smaller biasing force in a state when the compression length was short, in which case the electrode tips would fall off from the supply port that opened to the underside of the electrode tip magazine.

In view of this, the applicants of the present application have proposed an electrode tip magazine for a spot welder shown in Patent Document 1. This electrode tip magazine for a spot welder shown in Patent Document 1 is structured, as shown in FIG. 25, such that a spiral spring 52 is mounted on the side of the supply port 51a of a rack body 51 to pull a push-out member 53 by the spiral spring 52 so as to supply the electrode tips 55 one by one by pushing them out from the supply port 51a with the push-out member 53 by the spiral spring 52. With this structure in which the push-out member 53 is pulled by the spiral spring 52, the biasing force is made almost constant, whereby it is unlikely that the electrode tips 55 fall off from the supply port 51a.

However, because of the structure in which the push-out member 53 is pulled by the spiral spring 52, the spiral spring 52 is mounted on the side of the supply port 51a, increasing the size around the supply port 51a. This would sometimes cause the problem that, depending on the type of the welding gun, the part where the spiral spring 52 was mounted interfered with the welding gun. This problem was usually solved by producing an electrode tip magazine for a spot welder that was specially customized such as attaching the spiral spring 52 beside the supply port 51a so that the magazine would not interfere with the welding gun. Producing electrode tip magazines for a spot welder in accordance with the shapes of welding guns to be used like this would cause the problem of a very high cost.

Patent Document 1: Japanese Published Unexamined Patent Application No. 2006-68787

SUMMARY OF THE INVENTION

The present invention aims at solving the above problems and provides an electrode tip magazine for a spot welder that does not interfere with the welding gun.

Means for Solving the Problems

The present invention devised to solve the above problems is an electrode tip magazine for a spot welder storing a plurality of electrode tips such that the electrode tips to be used for spot welding are supplied one by one to a supply port (i.e., opening), having:

a magazine body (1) formed with a storage part (1a) that slidably aligns and stores the plurality of electrode tips (20) therein, one end of this storage part (1a) serving as an externally opened supply port (1b);

a push-out member (2) disposed to be slidable between both ends inside the storage part (1a);

a pulley (5) disposed at a position adjacent to the supply port (1b) of the magazine body (1);

a spiral spring (4) disposed at a position at the other end of the storage part (1a) of the magazine body (1); and a wire (6) connecting a distal end of the spiral spring (4) and the push-out member (2) with an intermediate portion thereof being wound around the pulley (5) so as to always pull the push-out member (2) toward the supply port (1b) by a biasing force of the spiral spring (4).

It is preferable to rotatably attach a bobbin (3) in a reel shape with a shaft to the magazine body (1) and to mount the spiral spring (4) by winding it around the bobbin (3).

It is preferable to structure the magazine such that guide pins (7, 8) are provided to protrude from a side face of the push-out member (2) and to make sliding engagement with guide holes (1c, 1d) formed in a side wall of the storage part (1a).

It is preferable to attach the magazine body (1) to a swing unit (30) that is configured to be slidable both back-and-forth and right-and-left.

Since the magazine includes a magazine body (1) formed with a storage part (1a) that slidably aligns and stores the plurality of electrode tips (20) therein, one end of this storage part (1a) serving as an externally opening supply port (1b);

a push-out member (2) disposed to be slidable between both ends inside the storage part (1a);

a pulley (5) disposed at a position adjacent to the supply port (1b) of the magazine body (1);

a spiral spring (4) disposed at a position at the other end of the storage part (1a) of the magazine body (1); and a wire (6) connecting a distal end of the spiral spring (4) and the push-out member (2) with an intermediate portion thereof being wound around the pulley (5) so as to always pull the push-out member (2) toward the supply port (1b) by a biasing force of the spiral spring (4), it is made possible to provide the spiral spring (4) on the opposite side of the supply port (1b) of the magazine body (1), which in turn made it possible to provide an electrode tip magazine for a spot welder which is not bulky around the supply port (1b) and which never interferes with the shanks of the welding gun.

Rotatably attaching a bobbin (3) in a reel shape with a shaft to the magazine body (1) and mounting the spiral spring (4) by winding it around the bobbin (3) will make the movement of the spiral spring (4) smooth, making the movement of the push-out member (2) inside the storage part (1a) smooth, whereby it is possible to reliably retain the electrode tips (20) inside the storage part (1a). A structure in which guide pins (7, 8) are provided to protrude from a side face of the push-out member (2) and to make sliding engagement with guide holes (1c, 1d) formed in a side wall of the storage part (1a) will make the movement of the push-out member (2) smooth, whereby it is possible to reliably retain the electrode tips (20) inside the storage part (1a).

Attaching the magazine body (1) on a swing unit (30) that is configured to be slidable both back-and-forth and right-and-left allows the magazine body (I) to slide back-and-forth and right-and-left as it follows the shanks of the welding gun when attaching electrode tips (20) to the shanks of the welding gun, whereby it is possible to reliably attach the electrode tips (20) to the shanks of the welding gun without damaging the shanks of the welding gun.

BRIEF DESCRIPTION OF THE DRAWINGS

FIG. 25 is an explanatory view showing a conventional embodiment.

Figure 1:
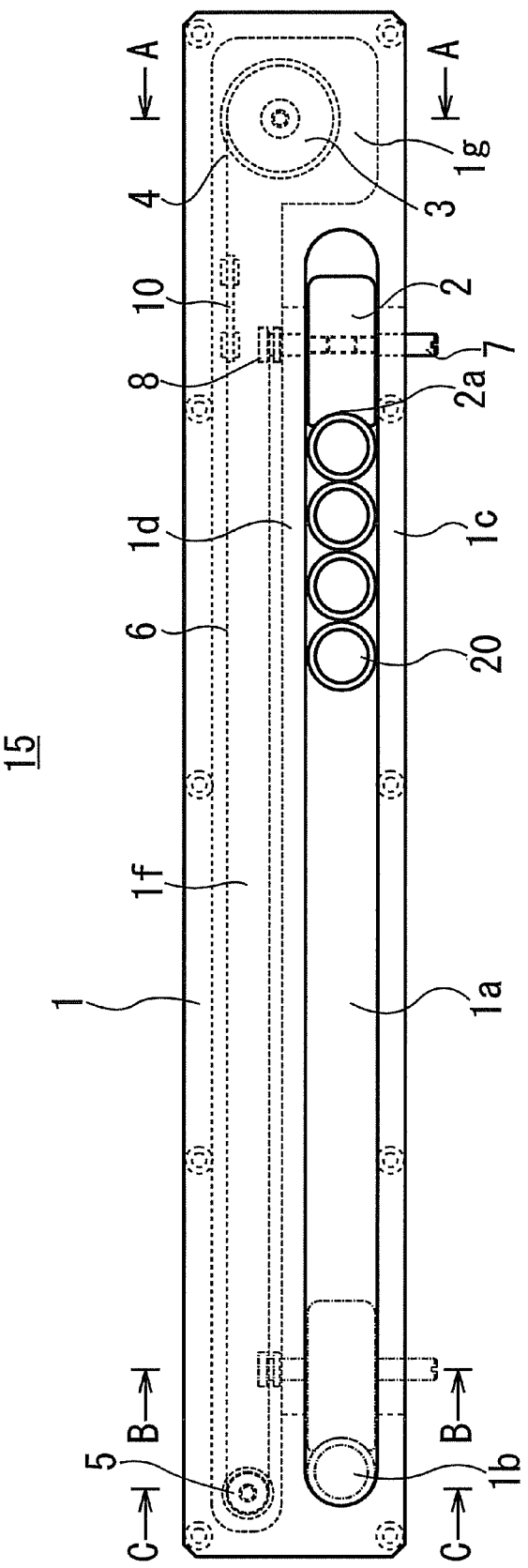
FIG. 1 is a top plan view of an electrode tip magazine for a spot welder, showing one embodiment of the present invention.

DESCRIPTION OF REFERENCE NUMERALS 1 magazine body
1a storage part
1b supply port
1c guide hole
1d guide hole
1f hollow part
1g bobbin storage part
2 push-out member
2a contact portion
3 bobbin
4 spiral spring
5 pulley
5a reel portion
6 wire
7 guide pin
8 guide pin
9 closure member
10 coupling member
15 electrode tip magazine for a spot welder
16 cover member
18 slide member
20 electrode tip
30 swing unit
30a stationary plate
30b movable plate
30c spring
32 shank guide
32a shank introduction recess
40 magazine unit
41 handle
42 hold-down shaft
51 rack body
51a supply port
52 spiral spring
53 push-out member
55 electrode tip

DETAILED DESCRIPTION OF THE INVENTION

Structure of the Present Invention

Preferred embodiments of the present invention will be hereinafter described with reference to the drawings (first embodiment).

Figure 2:
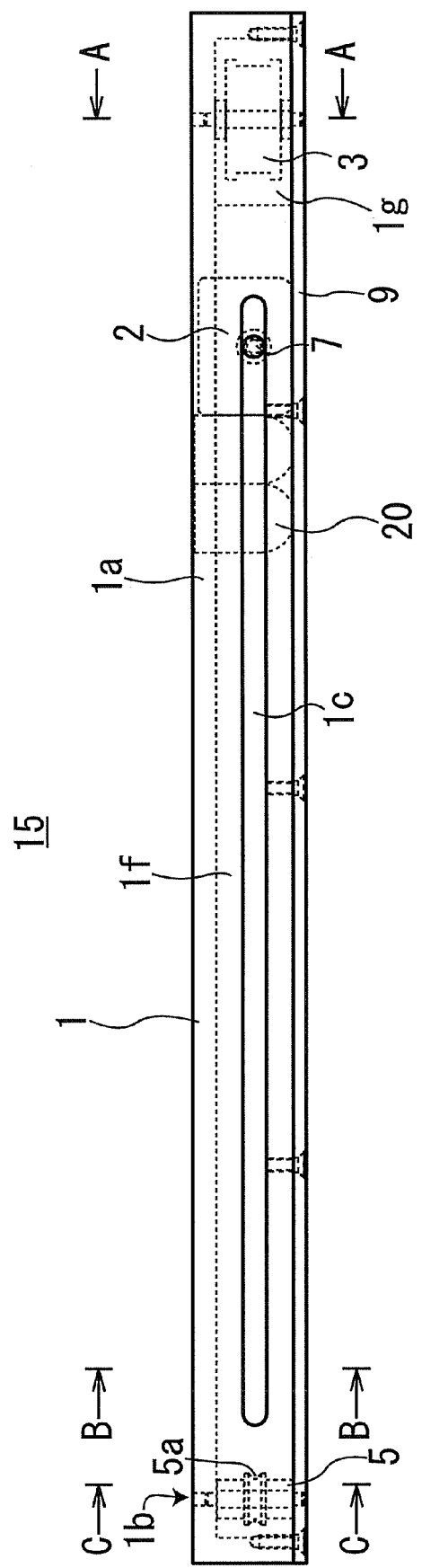
FIG. 2 is a side view of FIG. 1.
Figure 3:
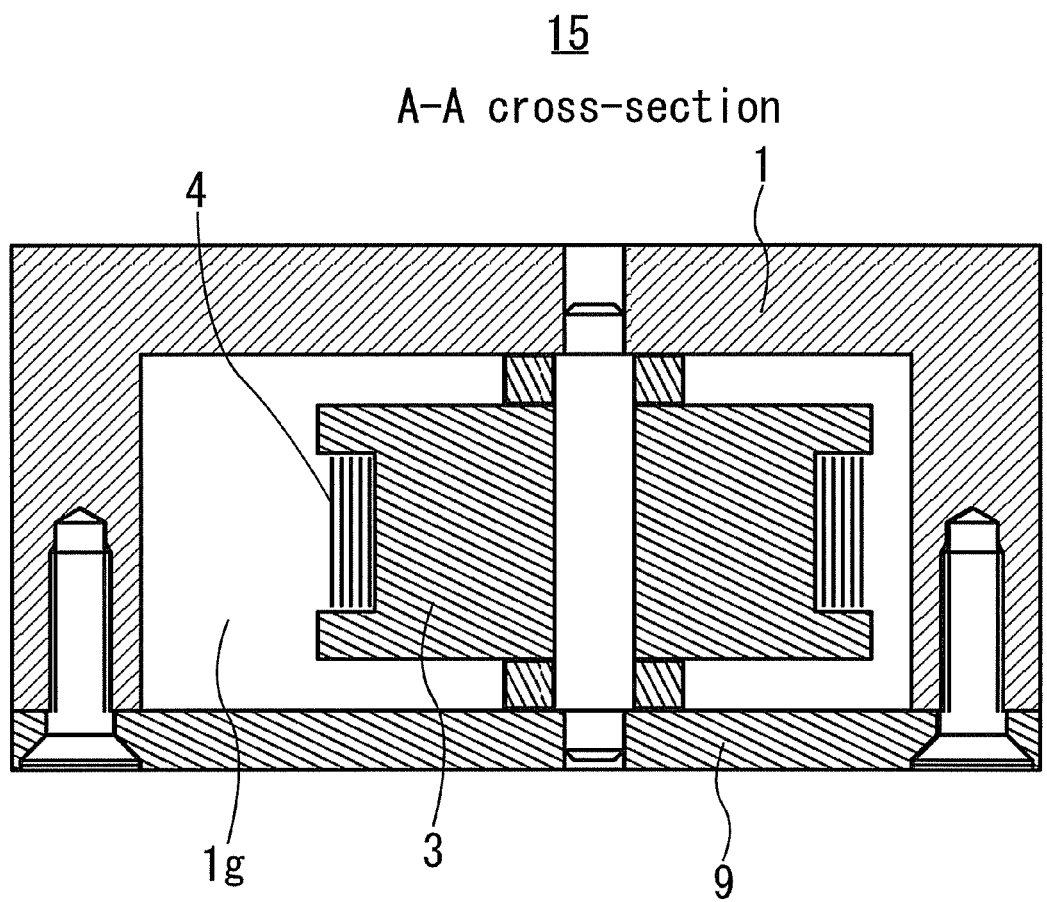
FIG. 3 is a cross sectional view taken along the line A-A of FIG. 1.
Figure 4:
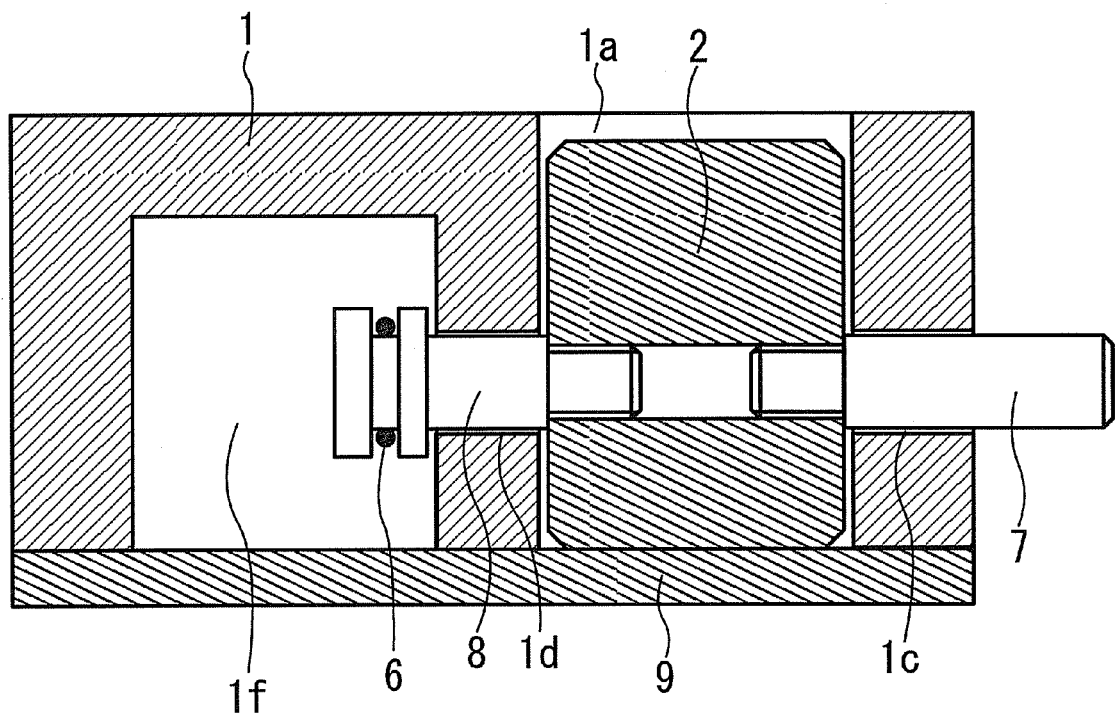
FIG. 4 is a cross sectional view taken along the line B-B of FIG. 1.
Figure 5:
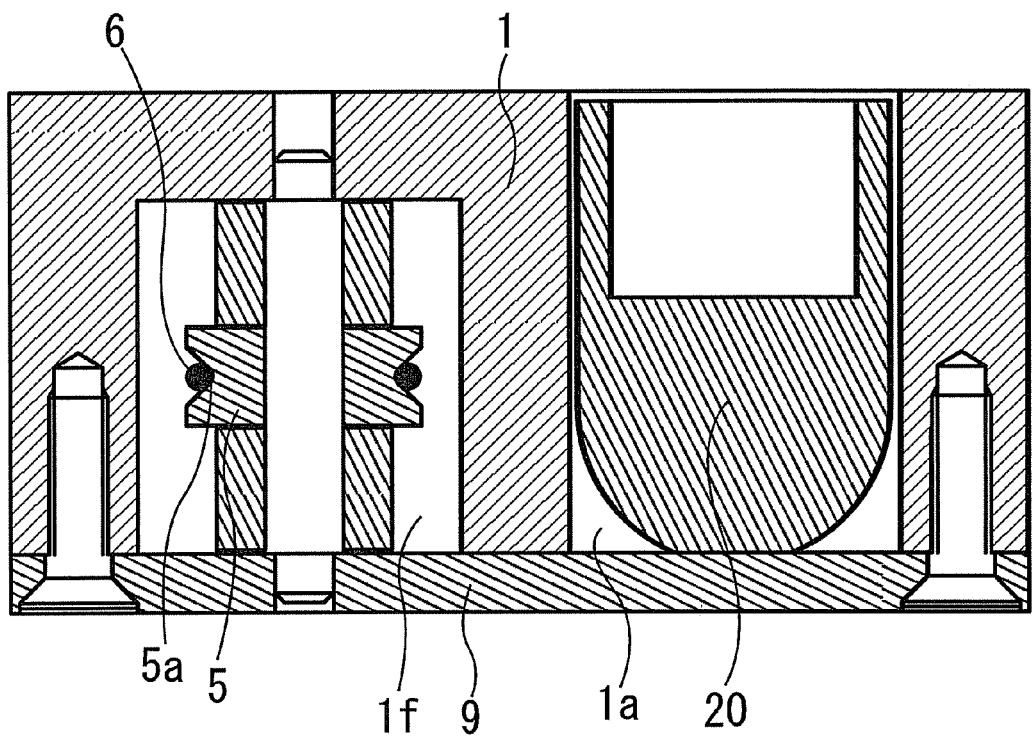
FIG. 5 is a cross sectional view taken along the line C-C of FIG. 1.

FIG. 1 is a top plan view of an electrode tip magazine for a spot welder, showing one embodiment of the present invention, FIG. 2 is a side view of FIG. 1, FIG. 3 is a cross sectional view taken along the line A-A of FIG. 1, FIG. 4 is a cross sectional view taken along the line B-B of FIG. 1, and FIG. 5 is a cross sectional view taken along the line C-C of FIG. 1. The electrode tip magazine 15 for a spot welder of the present invention is mainly constituted by a magazine body 1, a push-out member 2, a bobbin 3, a spiral spring 4, a pulley 5, and a wire 6. The magazine body 1 is in the form of an elongated block and formed with a storage part 1a along the lengthwise direction. In this embodiment, the storage part 1a is a linearly formed recess in the magazine body 1, having an externally opened shape. The width of the storage part 1a is slightly larger than the outside diameter of the electrode tips 20 for spot welding (hereinafter simply referred to as "electrode tip 20"), for example, for the electrode tips 20 with an outside diameter of φ16 mm, the width of the storage part 1a is in the range between 16.5 mm and 17.5 mm. The storage part 1a slidably aligns and stores the electrode tips 20.

One end of the storage part 1a serves as a supply port 1b. This supply port 1b opens to the outside. Beside the storage part 1a in the magazine body 1 is formed a hollow part 1f that extends along the storage part 1a. In this embodiment, the hollow part 1f is open to the underside. As shown in FIG. 2, a guide hole 1c is formed in a side wall of the storage part 1a which is on the opposite side of the hollow part if. This guide hole 1c is formed along the storage part 1a so that the storage part 1a communicates to the outside. A guide hole 1d is formed in a side wall of the storage part 1a which is on the side of the hollow part 1f. This guide hole 1d is formed along the storage part 1a so that the storage part 1a communicates to the hollow part 1f. One end of the hollow part 1f which is on the opposite side of the supply port 1b is a bobbin storage part 1g.

The push-out member 2 is slidably disposed inside the storage part 1a. The push-out member 2 is in the shape of a block, and has an arc-concaved contact portion 2a in a form conforming to a side face of the electrode tip 20, on the side of the supply port 1b. On both side faces of the push-out member 2 are protruded guide pins 7 and 8. The guide pin 7 extends through the guide hole 1c and protrudes to the outside of the magazine body 1. The guide pin 8 extends through the guide hole 1d and protrudes into the hollow part 1f. This structure allows the guide pins 7 and 8 to slidably engage with the guide holes 1c and 1d. Therefore, the push-out member 2 can smoothly slide between both ends of the storage part 1a without wobbling.

In the hollow part 1f, at the end on the side of the supply port 1a is disposed the pulley 5. In other words, the pulley 5 is disposed adjacent to the supply port 1b in the magazine body 1. The pulley 5 is substantially columnar and formed with a recessed reel portion 5a that extends all around the pulley. The pulley 5 is rotatably attached with a shaft to the magazine body 1 and the closure member 9.

The plate-like closure member 9 is attached to the underside of the magazine body 1. The closure member 9 closes the underside of the hollow part 1f. The bobbin 3 is disposed inside the bobbin storage part 1g. In other words, the bobbin 3 is disposed at a position on the opposite side of the supply port 1b of the magazine body 1. The bobbin 3 is in a flat reel shape and rotatably attached with a shaft to the magazine body 1 and the closure member 9. The spiral spring 4 is attached to and wound around the bobbin 3. The spiral spring 4 is formed of a spirally-formed resilient metal plate material. The spiral spring 4 is resilient, so that even if the distal end of the spiral spring 4 is pulled, it winds back up in the coil form and restores to its original shape.

The distal end of the spiral spring 4 is coupled to one end of the wire 6 by means of a coupling member 10. The wire 6 in this embodiment is a metallic cord, but the wire 6 of the present invention should not be limited to this and the wire 6 may be made of resin, cotton yarn, or the like.

An intermediate portion of the wire 6 is wound around the pulley 5, and the other end of the wire 6 is coupled to the push-out member 2. In this embodiment, the other end of the wire 6 is coupled to the protruding end of the guide pin 8. Thus the wire 6, while its intermediate portion is wound around the pulley 5, connects the distal end of the spiral spring 4 and the push-out member 2, so that the push-out member 2 is always pulled toward the supply port 1b, by means of the biasing force of the spiral spring 4.

(Working of the Invention)

When storing electrode tips 20 in this electrode tip magazine 15 for a spot welder of the present invention, first, the guide pin 7 is slid toward the bobbin 3 so as to slide the push-out member 2 toward the bobbin 3. Doing this creates a space between the supply port 1b of the storage part 1a and the contact portion 2a of the push-out member 2, and multiple electrode tips 20 are inserted into this space so as to be aligned and stored therein. When the guide pin 7 is released, the restoring force (biasing force) of the spiral spring 4 causes the push-out member 2 to be pulled toward the supply port 1a. The contact portion 2a of the push-out member 2 abuts an outer circumferential surface of the electrode tip 20 so that the plurality of electrode tips 20 are retained inside the storage part 1a. With the restoring force of the spiral spring 4 always biasing the push-out portion 2 toward the supply port 1b, the electrode tips 20 will not fall off the electrode tip magazine for a spot welder of the present invention, even if the supply port 1b is opened to the underside.

When a shank-tip of a welding gun is inserted to the distal end of the supply port 1b, an electrode tip 20 is mounted to the welding gun. With the electrode tip 20 mounted to the shank tip of the welding gun, when the shank tip of the welding gun is pulled from the supply port 1b, the push-out member 2 slides toward the supply port 1b, pushing the electrode tips 20 stored in the storage part 1a toward the supply port 1b side, thereby retaining the electrode tips 20 stored in the storage part 1a. Thus the electrode tips 20 stored in the storage part 1a are supplied one by one to the supply port 1b.

Even when there are a fewer number of electrode tips inside the storage part 1a, the electrode tips 20 will not fall off the electrode tip magazine for a spot welder of the present invention, since the biasing force of the spiral spring 4 is almost constant.

Thus, according to the present invention, the biasing direction of the spiral spring 4 is inverted by means of the pulley 5 to make it possible to provide the spiral spring 4 on the opposite side of the supply port 1b of the magazine body 1, which in turn has enabled provision of the electrode tip magazine 15 for a spot welder, which is not bulky around the supply port 1b and does not interfere with the shanks of the welding gun.

(Description of the Magazine Unit)

Figure 6:
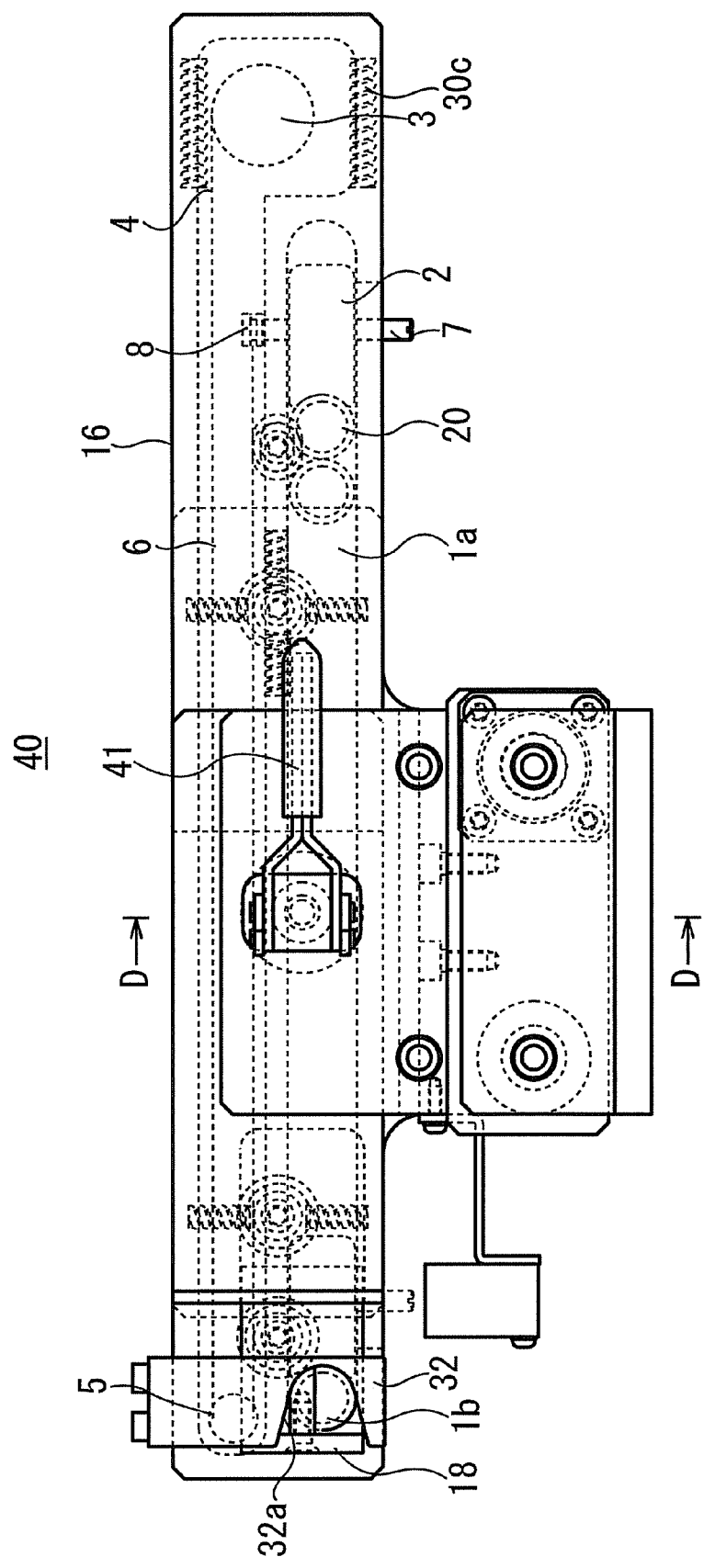
FIG. 6 is a top plan view of a state in which the electrode tip magazines for a spot welder of the present invention are attached to a tip changer.
Figure 7:
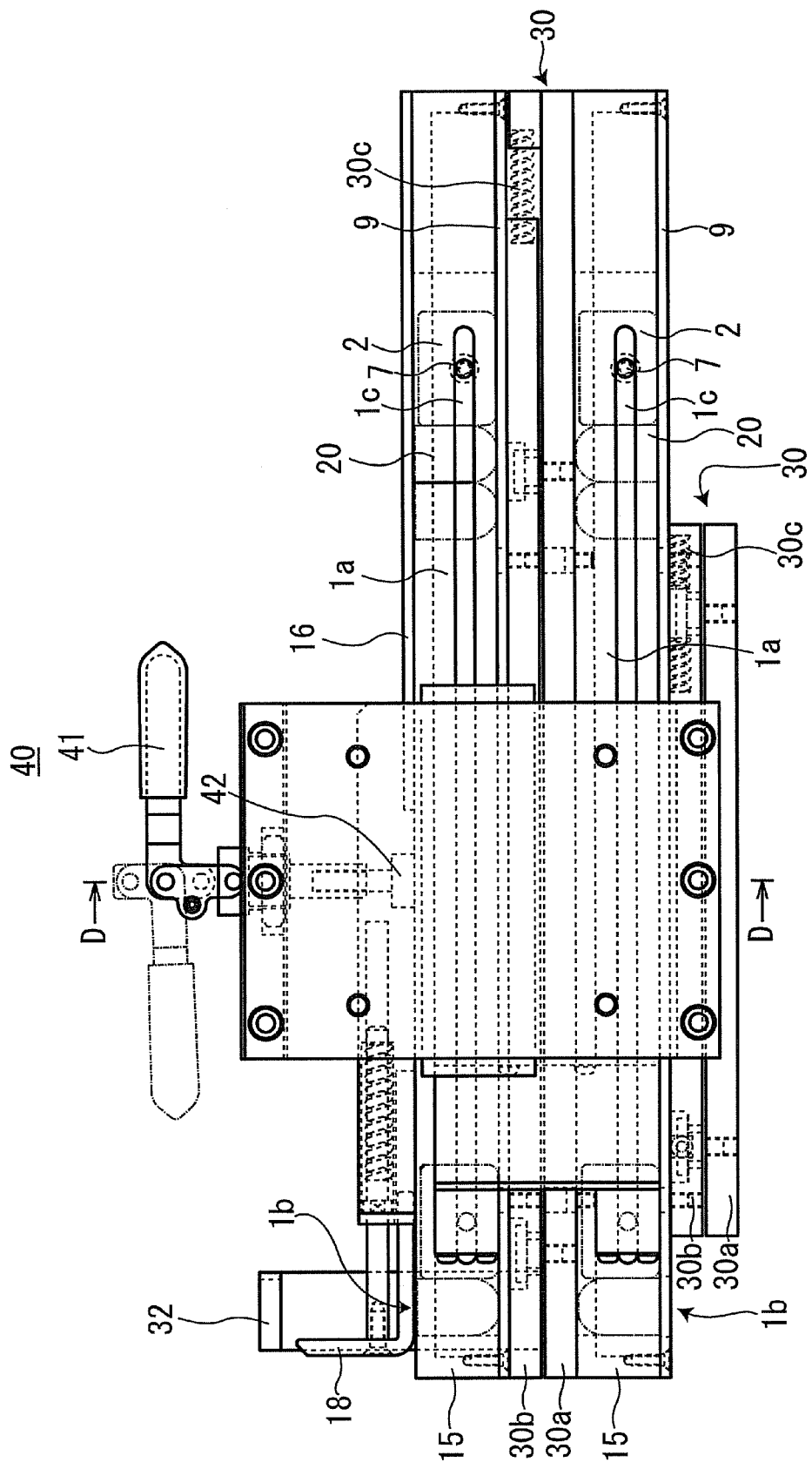
FIG. 7 is a side view of FIG. 6.
Figure 8:
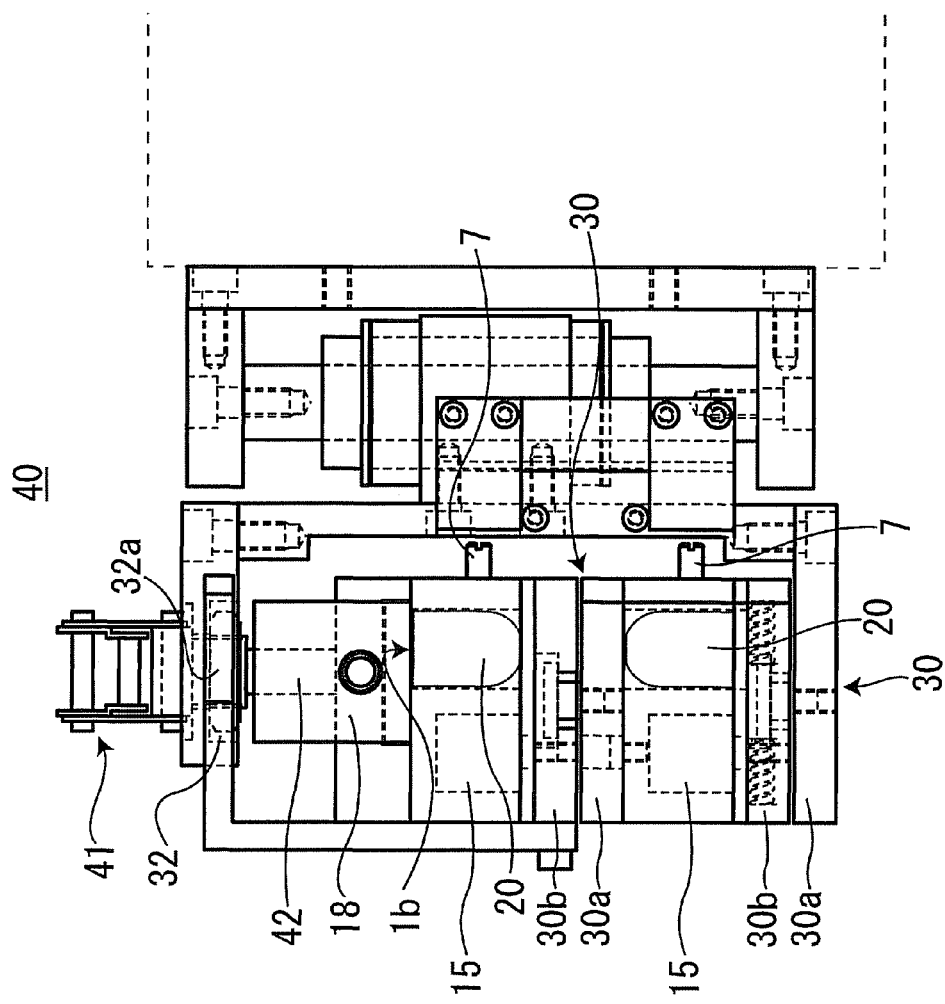
FIG. 8 is a front view of FIG. 6.
Figure 9:
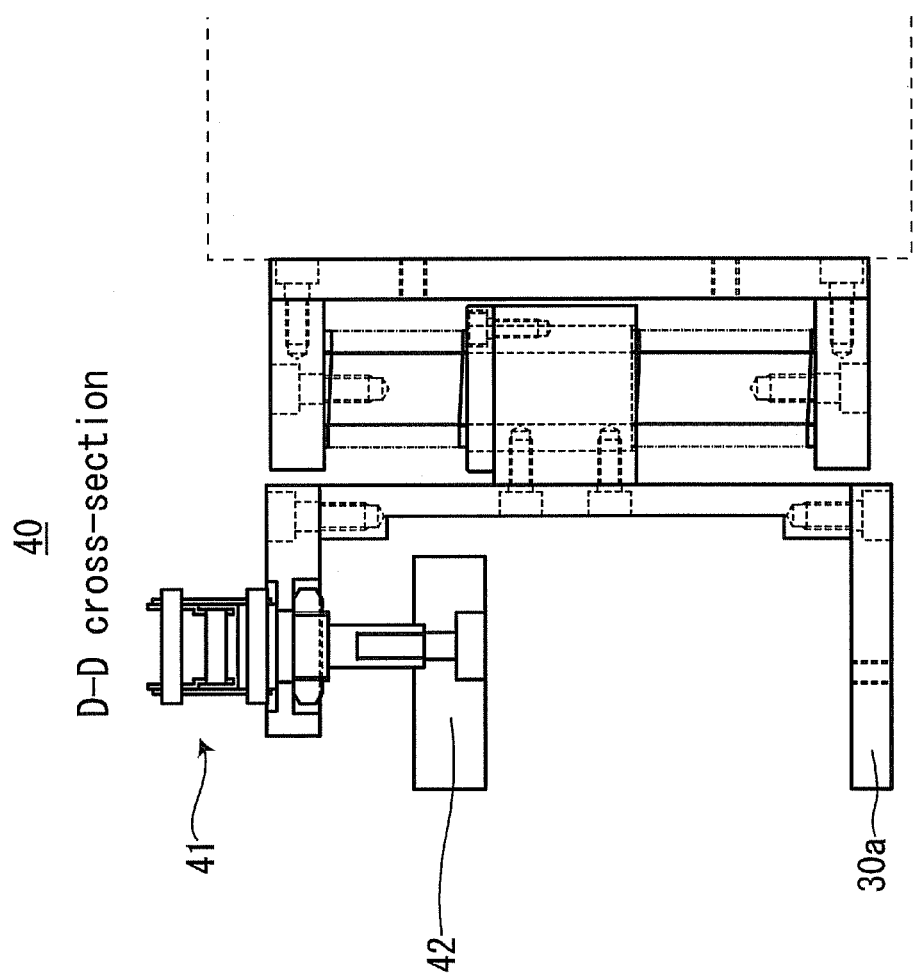
FIG. 9 is a cross sectional view taken along the line D-D of FIG. 6.

FIG. 6 shows a top plan view of a state in which the electrode tip magazines 15 for a spot welder of the present invention are attached to a magazine unit 40. FIG. 7 shows a side view of FIG. 6, and FIG. 8 shows a front view of FIG. 6. FIG. 9 shows a cross section, taken along the line D-D of FIG. 6, of a state in which the electrode tip magazines 15 for a spot welder of the present invention have been removed. The electrode tip magazines 15 for a spot welder of the present invention are mounted on swing units 30. This swing unit 30 is mainly constituted by a plate-like stationary plate 30a and a movable plate 30b which are arranged one on top of the other, the movable plate 30b being disposed such that it is placed on a ball plunger embedded in the stationary plate 30a. The movable plate 30b is freely slidable both back-and-forth and right-and-left relative to the stationary plate 30a, and is always biased forward by a spring 30c attached to the stationary plate 30a. Since the movable plate 30b is placed on the ball plunger as described above, it is also movable up and down.

The electrode tip magazines 15 for a spot welder are mounted on the movable plates 30b of respective swing units 30, arranged one on top of the other. The supply port 1b of the upper electrode tip magazine 15 for a spot welder is open to the upper side, while the supply port 1b of the lower electrode tip magazine 15 for a spot welder is open to the underside. A cover member 16 is attached to the upper electrode tip magazine 15 for a spot welder such as to cover the upper face in order to prevent foreign matter from entering the storage part 1a.

A shank guide 32 is attached at the front end portion of the movable plate 30b of the upper swing unit 30. The shank guide 32 is formed with a forwardly opened recess that serves as a shank introduction recess 32a. At the front end portion of the upper electrode tip magazine 15 for a spot welder is also attached a slide member 18. This slide member 18 has a structure capable of sliding back and forth and is always biased forward so as to close the open part of the supply port 1b.

On the movable plate 30b of the swing unit 30 are embedded a plurality of knock pins that engage with the lower face of the electrode tip magazine 15 for a spot welder. The magazine unit 40 is provided with a handle 41, and turning this handle 41 in one direction lowers a hold-down member 42, while turning this handle 41 in the other direction lifts up the hold-down member 42. The electrode tip magazine 15 for a spot welder is mounted on the swing unit 30 by being placed on the movable plate 30b of the swing unit 30 with the above-mentioned knock pins engaging with the magazine, and the hold-down member 42 holding down the magazine. As described above, turning the handle 41 in the other direction lifts up the hold-down member 42, so that the electrode tip magazine 15 for a spot welder can be removed from the magazine unit 40. Due to this structure, mounting and dismounting of the electrode tip magazine 15 for a spot welder can be achieved simply by turning the handle 41, whereby the operation for loading electrode tips 20 in the electrode tip magazine 15 for a spot welder can be performed quickly.

The robot having the welding gun attached thereto is taught to align the tip of the lower shank of the welding gun with the supply port 1b of the lower electrode tip magazine 15 for a spot welder. Since the electrode tip magazines 15 for a spot welder are mounted on the swing units 30, when the upper shank of the welding gun is introduced into the shank introduction recess 32a of the shank guide 32 and abuts on the shank introduction recess 32a, the upper electrode tip magazine 15 for a spot welder slides back-and-forth and right-and-left. Therefore, even if the upper shank of the welding gun is somewhat misaligned relative to the lower shank, when the tip of the lower shank of the welding gun is inserted into the supply port 1b of the lower electrode tip magazine 15 for a spot welder, the upper shank of the welding gun abuts on the shank introduction recess 32a, whereupon the upper electrode tip magazine 15 for a spot welder slides as it follows the upper shank of the welding gun, so that the tip of the upper shank of the welding gun is guided to a position above the supply port 1b of the upper electrode tip magazine 15 for a spot welder. In this state, when the shanks of the welding gun are closed, the electrode tips 20 are attached to the tips of the shanks of the welding gun. The slide member 18 slides back when the upper shank of the welding gun abuts on it, whereby the supply port 1b of the upper electrode tip magazine 15 for a spot welder is opened.

As described above, since the electrode tip magazine 15 for a spot welder of the present invention is mounted on the swing unit 30, even if the shanks of the welding gun are somewhat misaligned relative to each other, the electrode tip magazine 15 for a spot welder slides back-and-forth and right-and-left, or up-and-down, so that electrode tips 20 can be reliably attached to the shanks of the welding gun without damaging the shanks of the welding gun.

Second Embodiment

Figure 10:
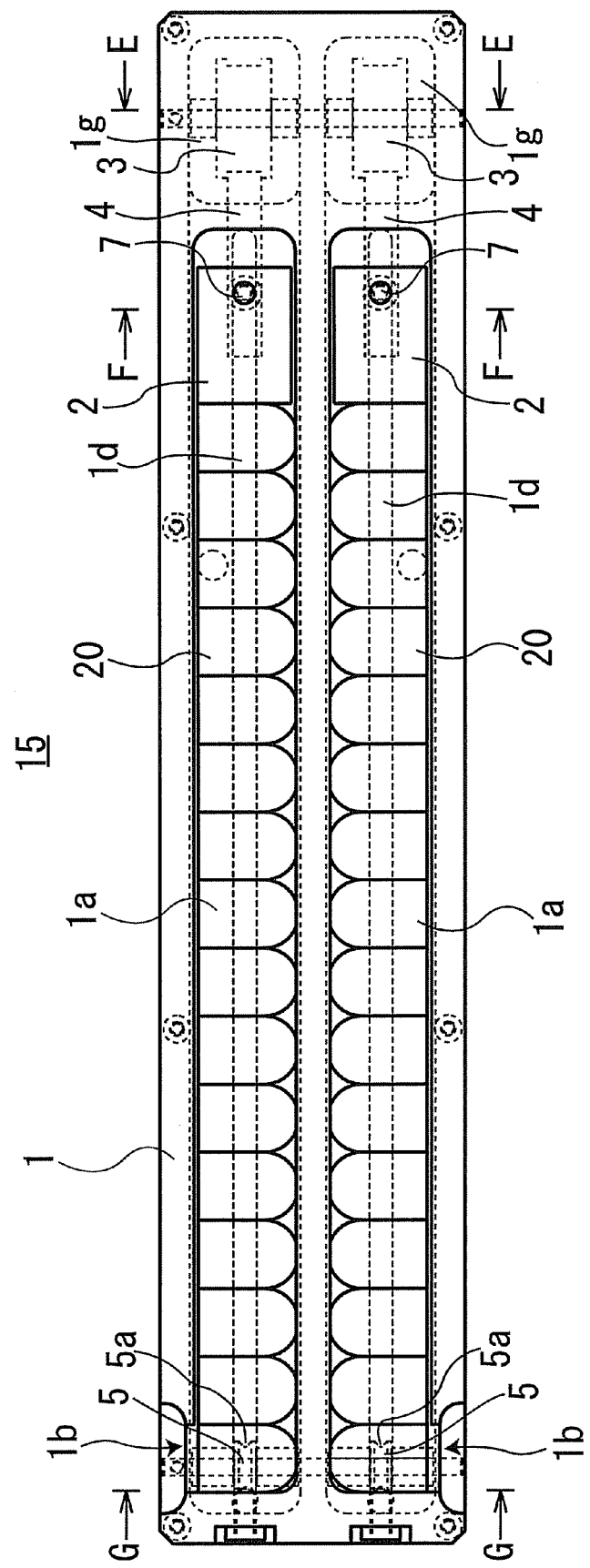
FIG. 10 is a top plan view of an electrode tip magazine for a spot welder according to a second embodiment.
Figure 11:
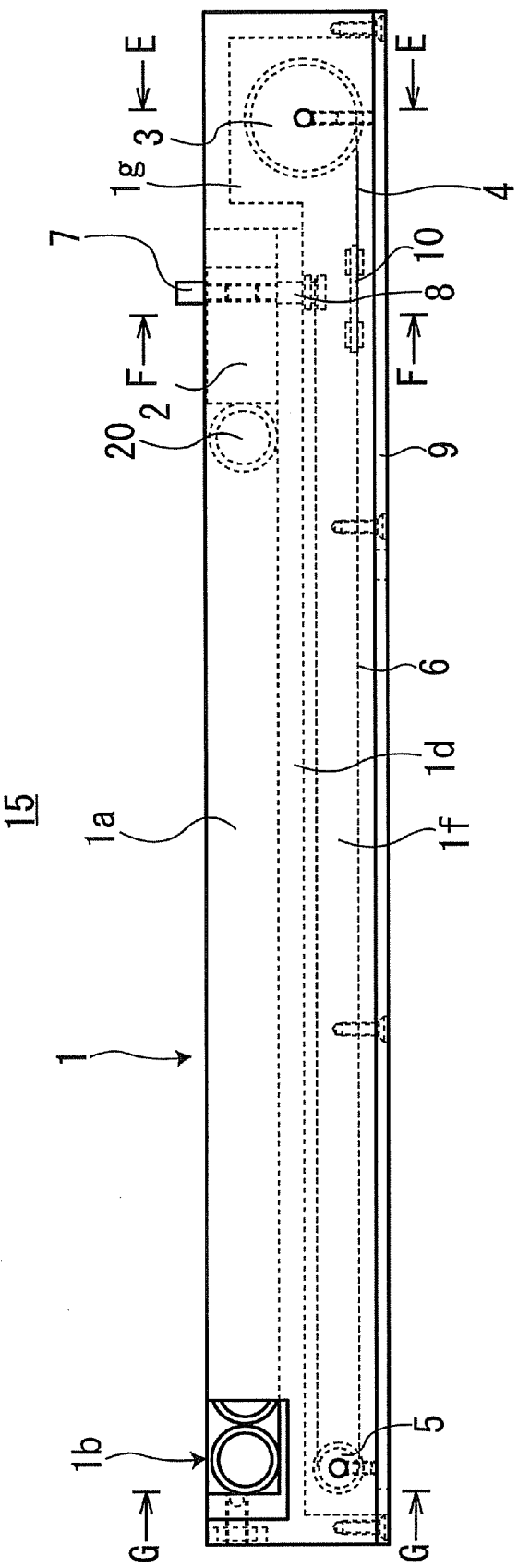
FIG. 11 is a side view of FIG. 10.
Figure 12:
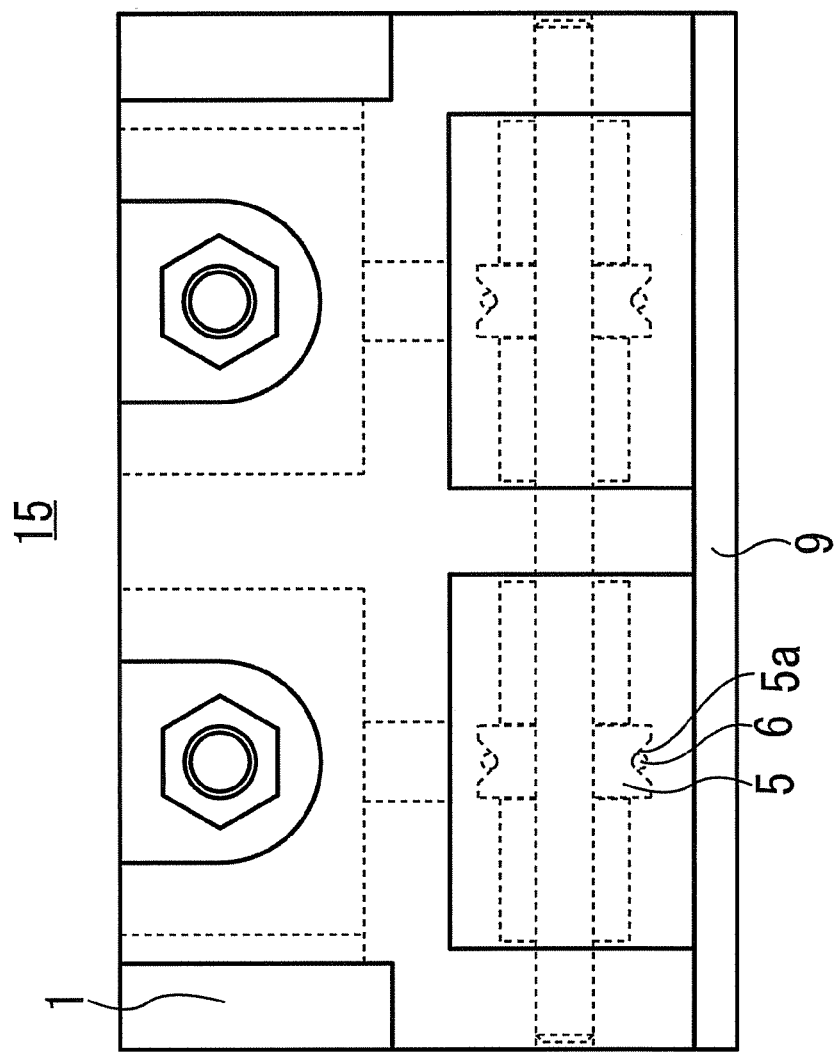
FIG. 12 is a front view of FIG. 10.
Figure 13:
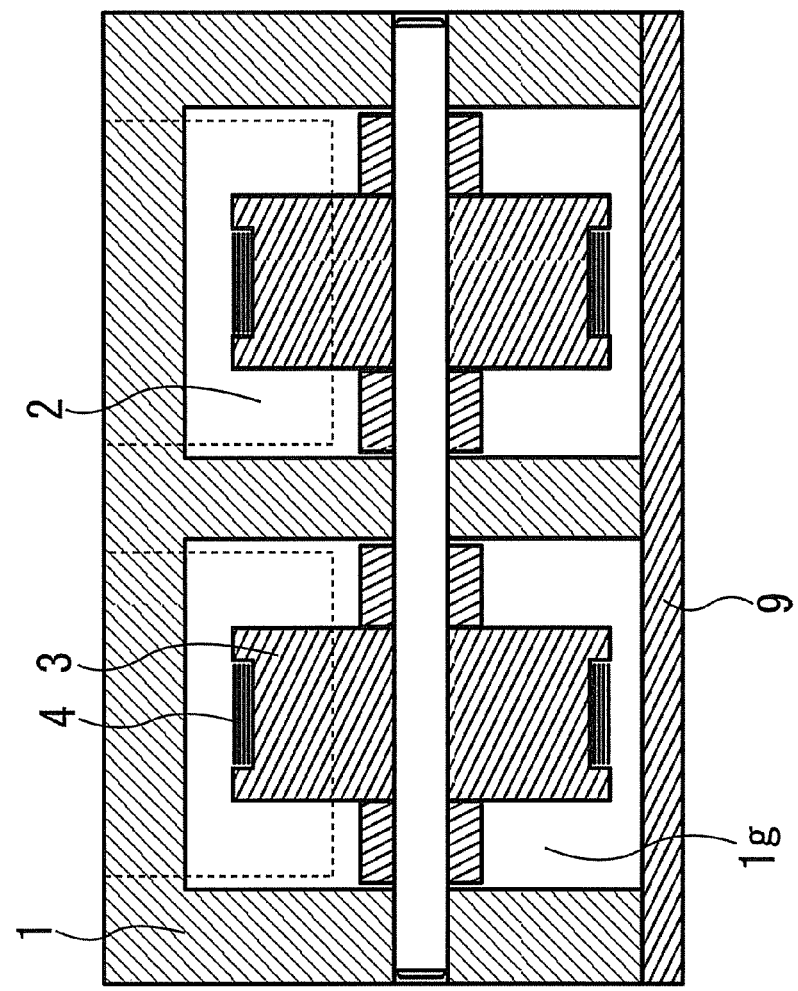
FIG. 13 is a cross sectional view taken along the line E-E of FIG. 10.
Figure 14:
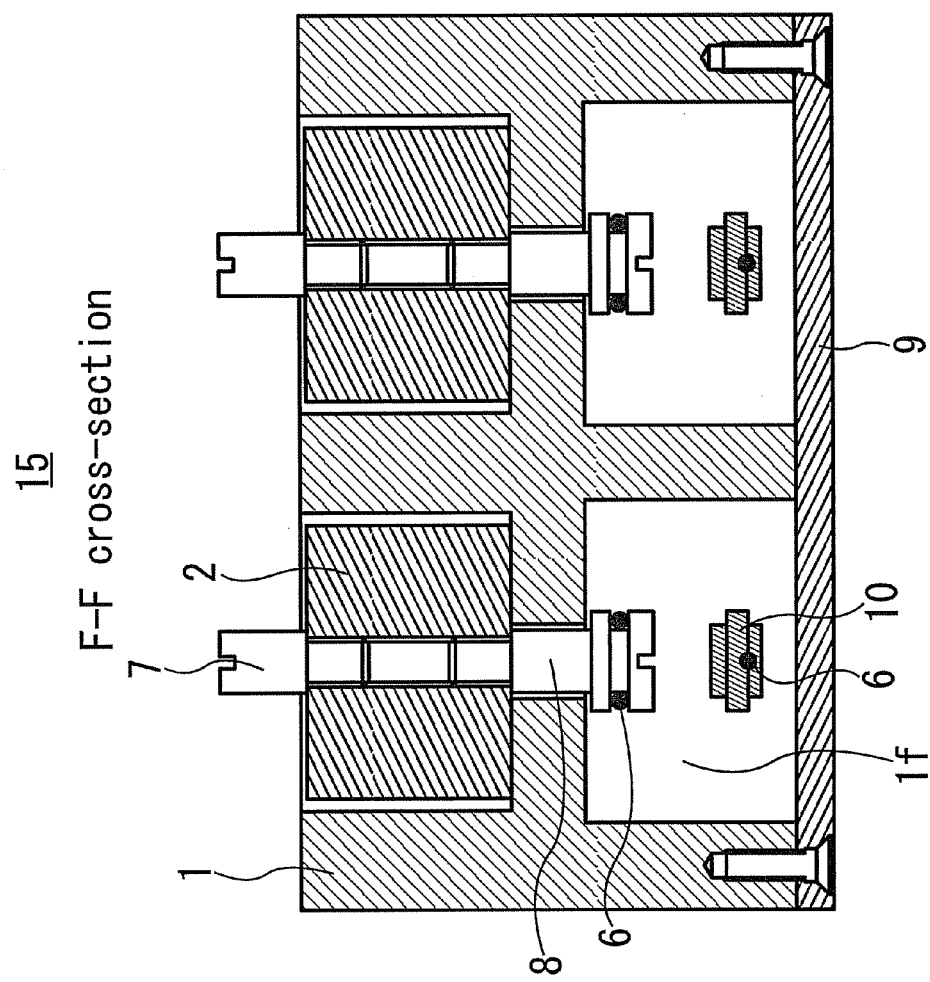
FIG. 14 is a cross sectional view taken along the line F-F of FIG. 10.
Figure 15:
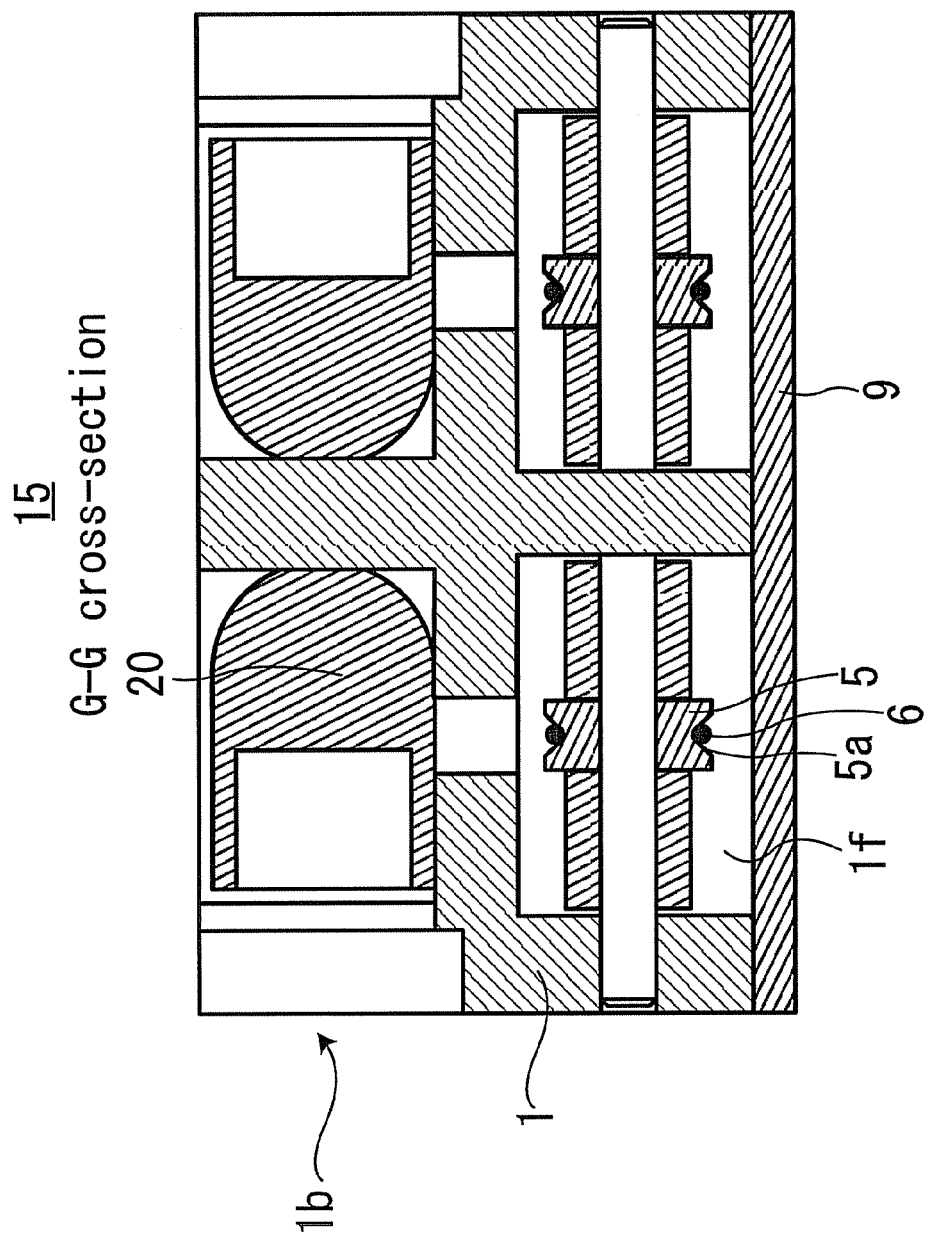
FIG. 15 is a cross sectional view taken along the line G-G of FIG. 10.
Figure 16:
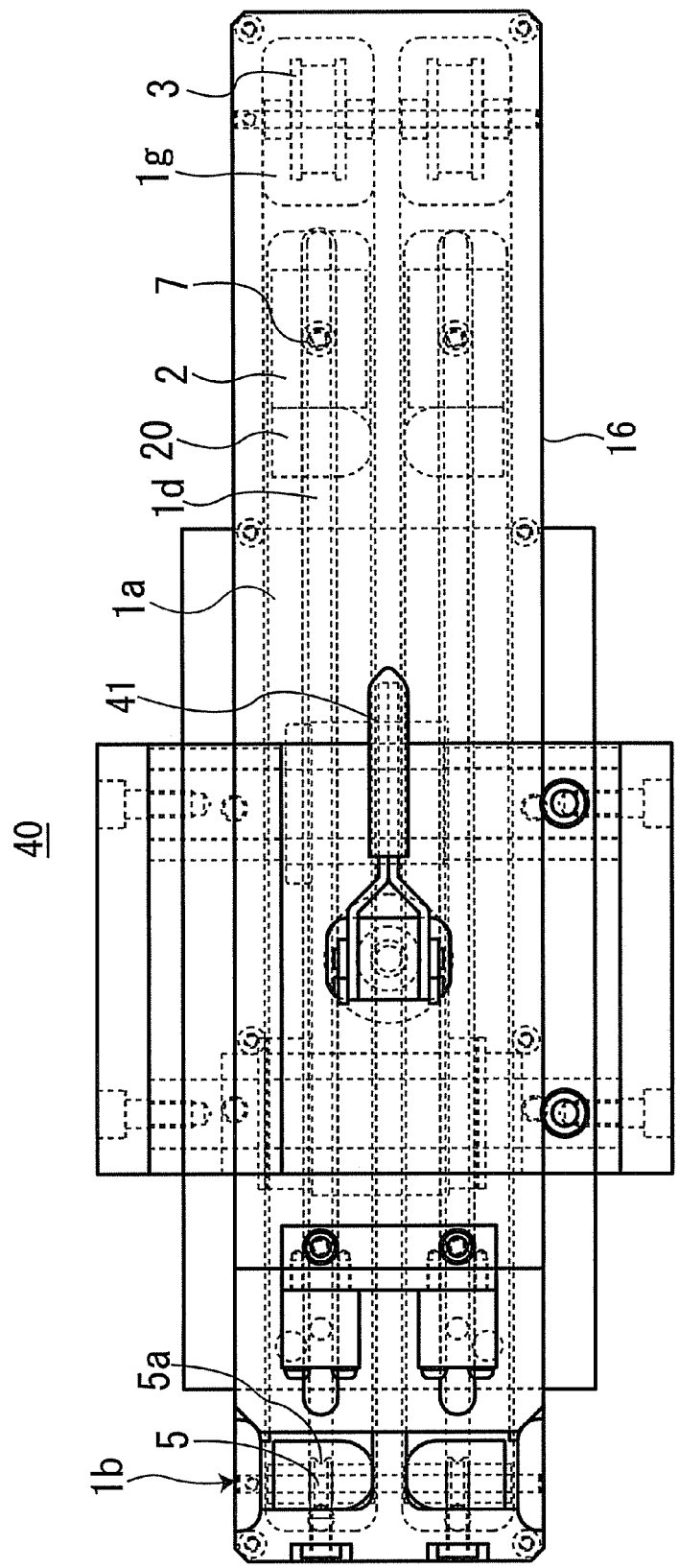
FIG. 16 is a top plan view of a state in which the electrode tip magazine for a spot welder according to the second embodiment is attached to a tip changer.
Figure 17:
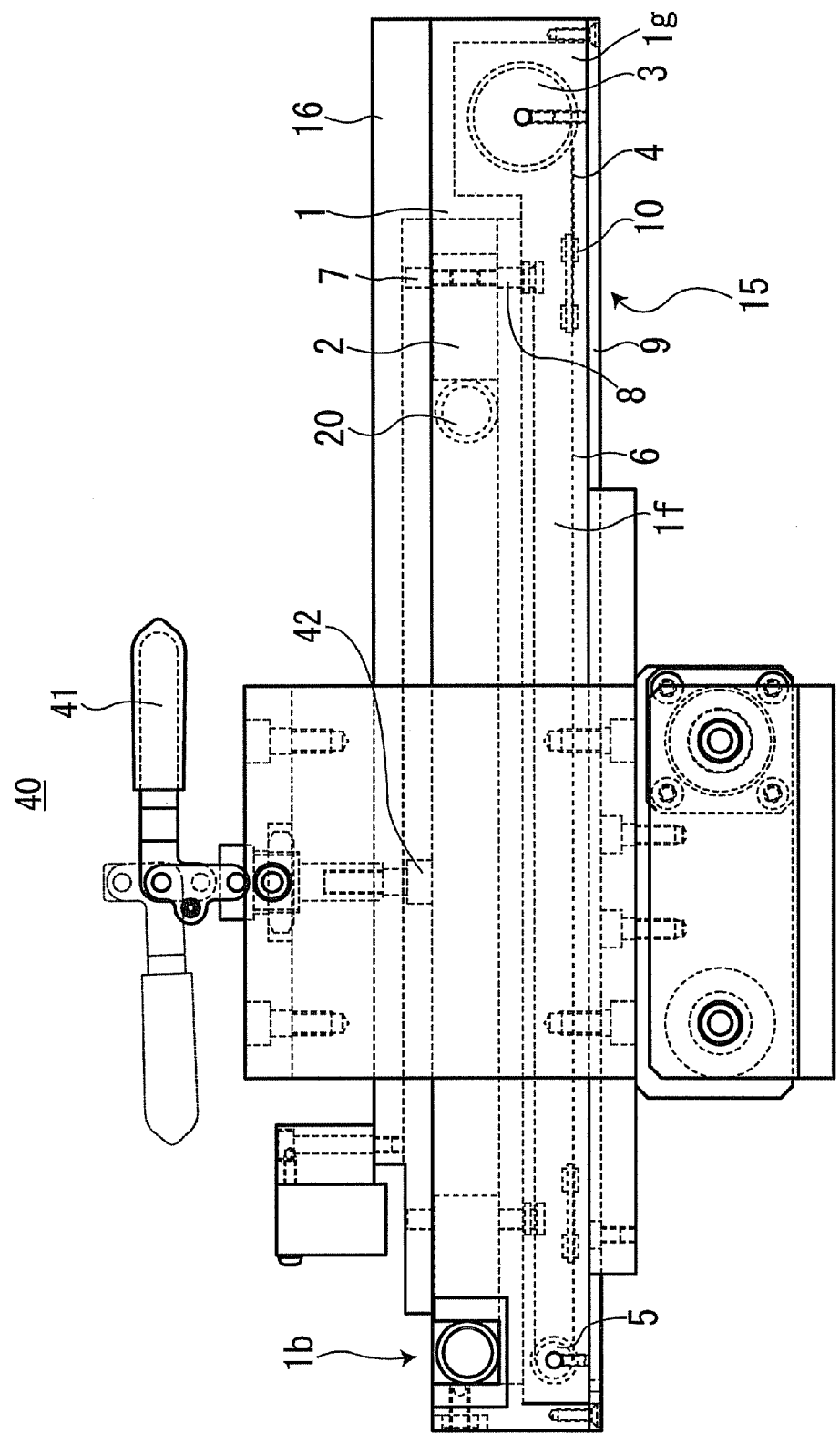
FIG. 17 is a side view of FIG. 16.
Figure 18:
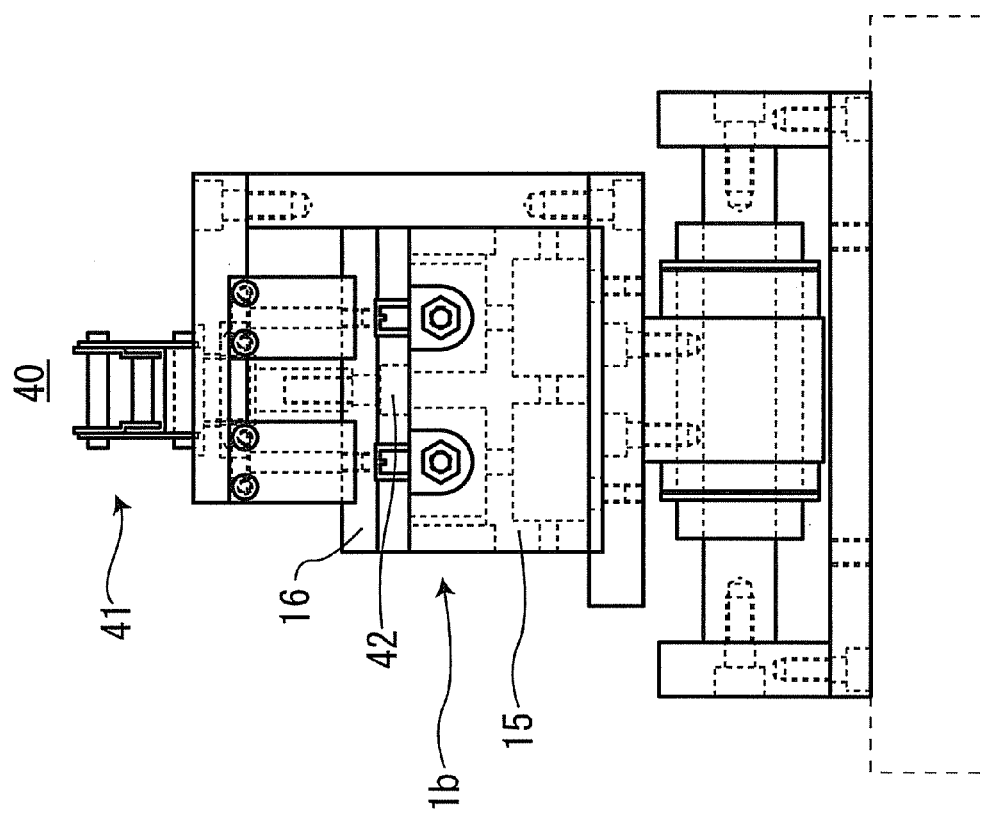
FIG. 18 is a front view of FIG. 16.

FIG. 10 shows a top plan view of the second embodiment, FIG. 11 shows a side view of FIG. 10, FIG. 12 shows a front view of FIG. 10, FIG. 13 shows a cross sectional view taken along the line E-E of FIG. 10, FIG. 14 shows a cross sectional view taken along the line F-F of FIG. 10, and FIG. 15 shows a cross sectional view taken along the line G-G of FIG. 10. This second embodiment of the electrode tip magazine for a spot welder is an embodiment in which supply ports 1b open in both side faces of the magazine body 1. The basic structure is the same as that of the first embodiment. FIG. 16 shows a top plan view of a state in which the second embodiment of the electrode tip magazine 15 for a spot welder is attached to a magazine unit 40. FIG. 17 shows a side view of FIG. 16, and FIG. 18 shows a front view of FIG. 16.

Third Embodiment

Figure 19:
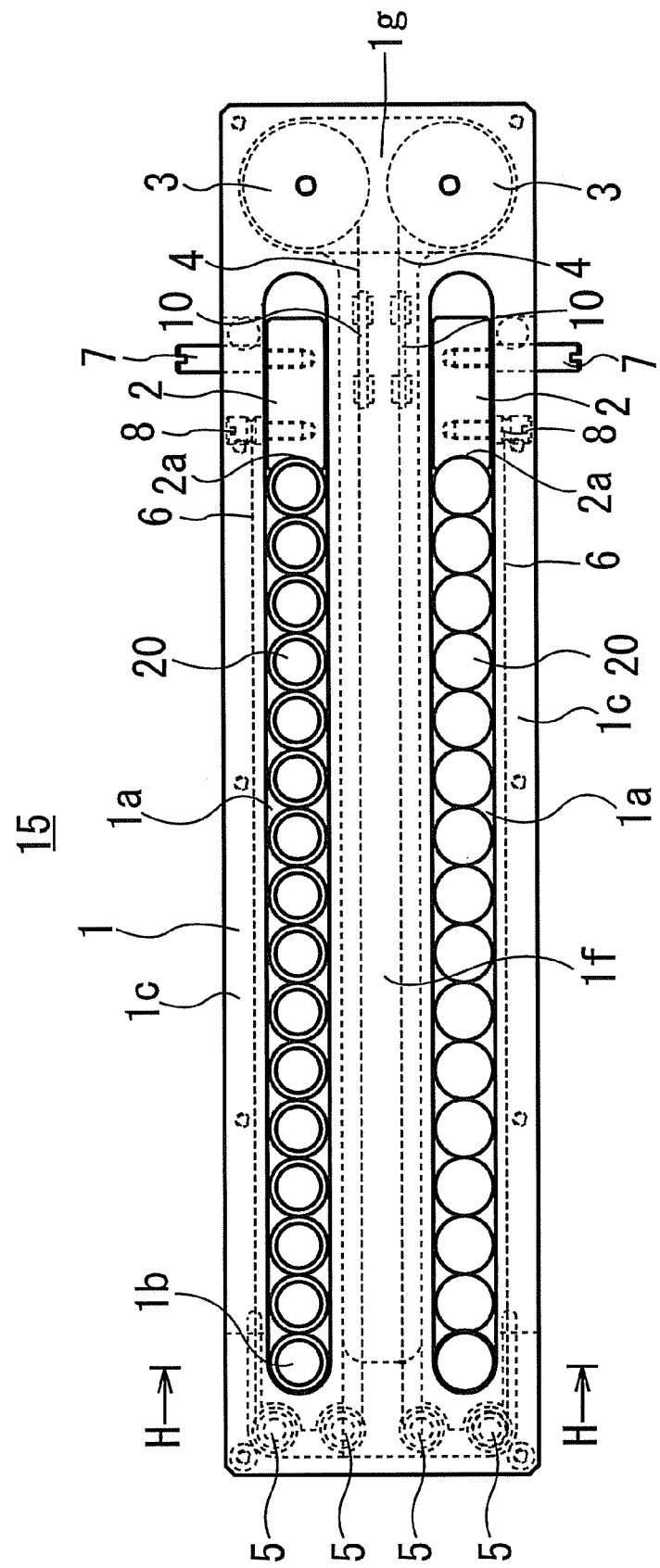
FIG. 19 is a top plan view of an electrode tip magazine for a spot welder according to a third embodiment.
Figure 20:
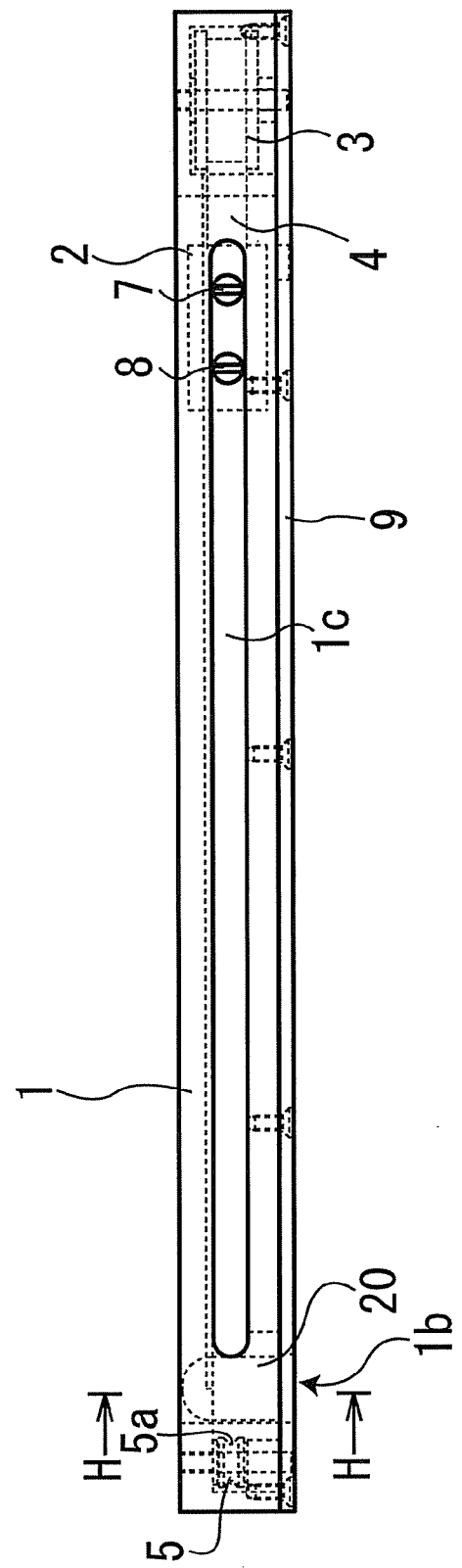
FIG. 20 is a side view of FIG. 19.
Figure 21:
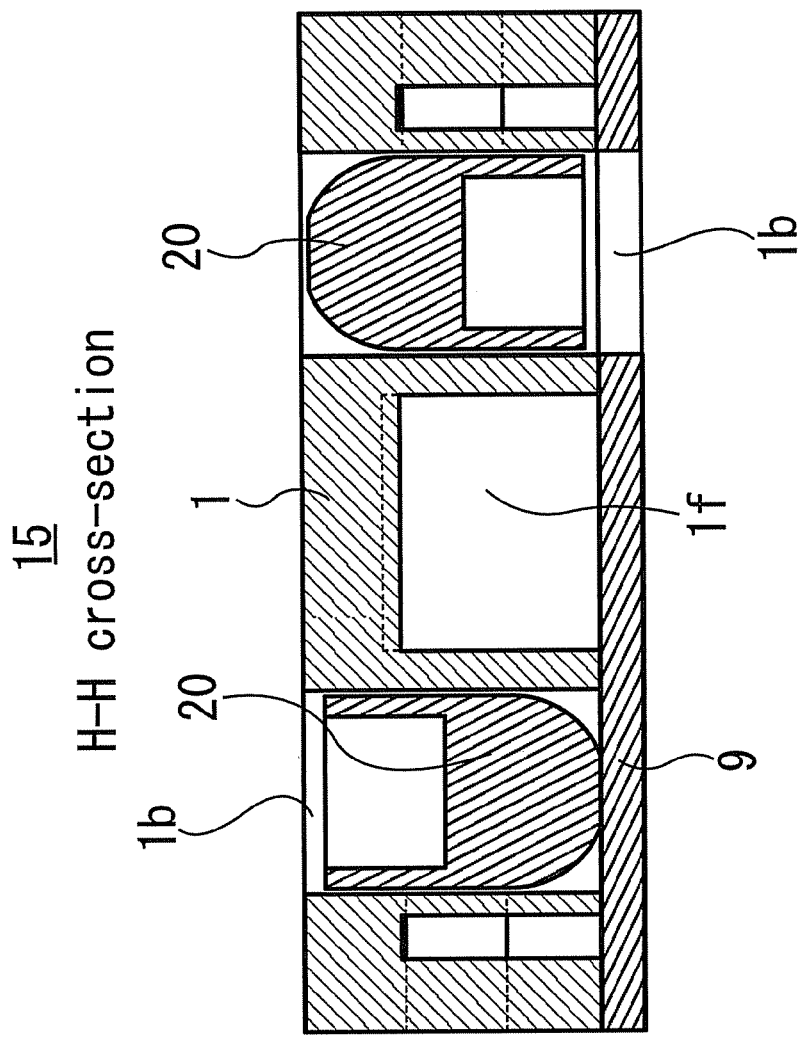
FIG. 21 is a cross-sectional view taken along the line H-H of FIG. 19.
Figure 22:
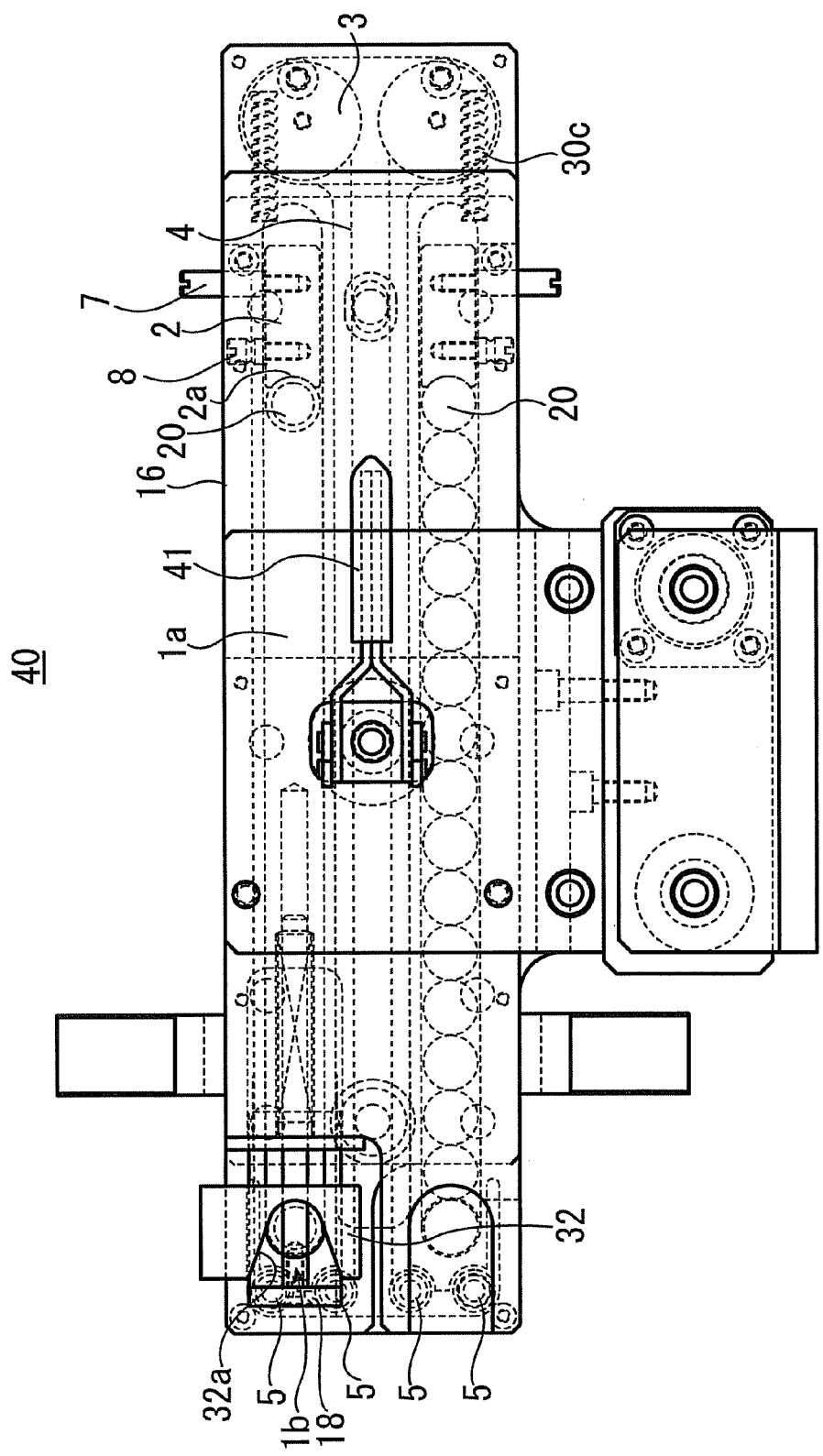
FIG. 22 is a top plan view of a state in which the electrode tip magazine for a spot welder according to the third embodiment is attached to a tip changer.
Figure 23:
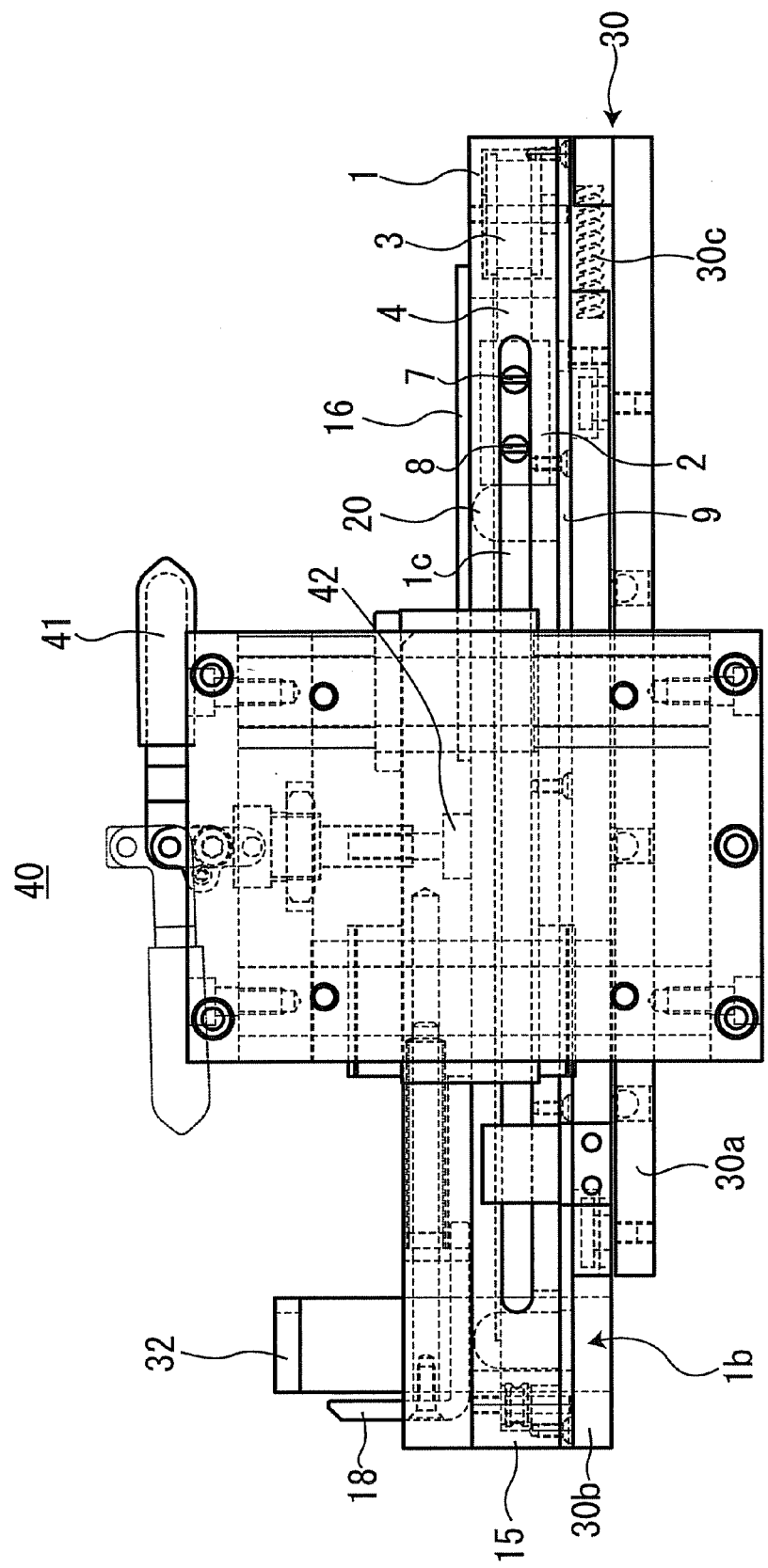
FIG. 23 is a side view of FIG. 22.
Figure 24:
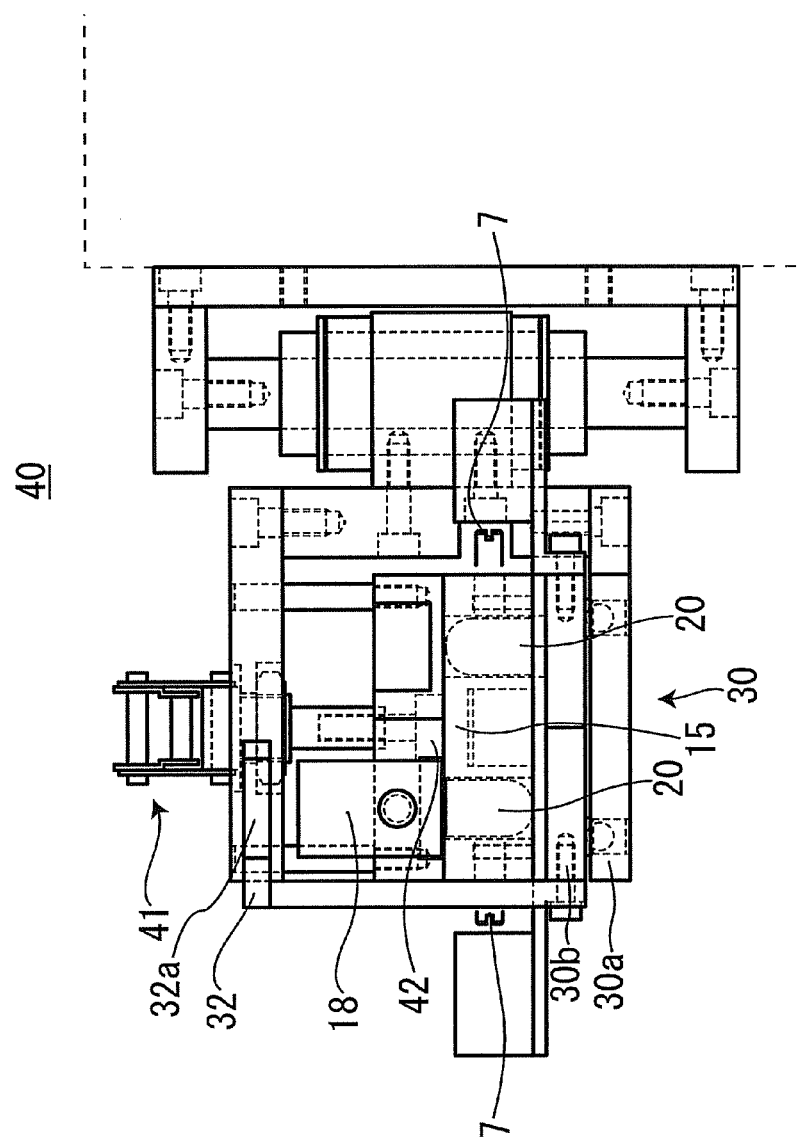
FIG. 24 is a front view of FIG. 22.

FIG. 19 shows a top plan view of the third embodiment, FIG. 20 shows a side view of FIG. 19, and FIG. 21 shows a cross-sectional view taken along the line H-H of FIG. 19. This third embodiment of the electrode tip magazine for a spot welder is an embodiment in which two storage parts 1a are formed adjacent each other, one supply port 1b being opened to the upper side, while the other supply port 1b being opened to the underside. The basic structure is the same as that of the first embodiment. FIG. 22 shows a top plan view of a state in which the third embodiment of the electrode tip magazine 15 for a spot welder is attached to a magazine unit 40. FIG. 23 shows a side view of FIG. 22, and FIG. 24 shows a front view of FIG. 22. In the third embodiment, the tip of one of the shanks of the welding gun, for example the lower shank tip, is inserted into the supply port 1b that is opened to the underside so that an electrode tip 20 is attached to the lower shank, while the upper shank tip is inserted into the supply port 1b that is opened to the upper side so that an electrode tip 20 is attached to the upper shank, whereupon the operation for attaching electrode tips 20 to the welding gun is complete.

While the electrode tip magazine for a spot welder of the present invention has been described with respect to the embodiment in which the storage part 1a is formed linearly, the electrode tip magazine for a spot welder of the present invention is not limited in this respect. It goes without saying that the present invention is also applicable to, for example, an electrode tip magazine for a spot welder with a storage part 1a formed in a circular arc shape.

Although the present invention has been described above in relation to embodiments that are currently believed to be most practical and preferable, it should be understood that the present invention is not limited to the embodiments disclosed in the specification of this application but may be changed suitably without departing from the scope of the invention or the basic idea thereof interpreted from the claims and the entire specification, and that electrode tip magazines for a spot welder with such changes are also included in the technical scope of the invention.

The invention claimed is:

1. An electrode tip magazine for a spot welder storing a plurality of electrode tips such that the electrode tips to be used for spot welding are supplied one by one to a supply opening, comprising:
   a magazine body formed with a storage part slidably aligning and storing the plurality of electrode tips therein, the magazine body having a longitudinally elongated shaped opening that extends continuously along a length of the storage part with one end of the storage part serving as an externally opened supply opening at a front end of the magazine body;
   a push-out member disposed to be slidable between both ends inside the storage part;
   a pulley disposed at a position adjacent to the supply opening of the magazine body;
   a spiral spring disposed at a position at the other opposite end of the storage part, wherein the spiral spring is arranged at the back end of the magazine body thereof; and
   a wire connecting a distal end of the spiral spring and the push-out member with an intermediate portion thereof being wound around the pulley so as to always pull the push-out member toward the supply opening by inverting a biasing force direction of the spiral spring,
   wherein the push-out member is connected to the wire by a guide pin, the side pin connects to the wire at one end, extends through the push-out member and an opposing end of the guide pin protrudes outside of the magazine body.

2. The electrode tip magazine for a spot welder according to claim 1, wherein a bobbin in a reel shape is rotatably attached with a shaft to the magazine body and the spiral spring is mounted by being wound around the bobbin.

3. The electrode tip magazine for a spot welder according to claim 1, wherein the magazine is structured such that the guide pin protrudes from a side face of the push-out member and makes sliding engagement with guide holes formed in a side wall of the storage part.

4. The electrode tip magazine for a spot welder according to claim 1, wherein the magazine body is attached to a swing unit configured to be slidable both back-and-forth and right-and-left.

5. The electrode tip magazine for a spot welder according to claim 2, wherein the magazine is structured such that the guide pin protrudes from a side face of the push-out member and makes sliding engagement with guide holes formed in a side wall of the storage part.

6. The electrode tip magazine for a spot welder according to claim 2, wherein the magazine body is attached to a swing unit configured to be slidable both back-and-forth and right-and-left.

7. The electrode tip magazine for a spot welder according to claim 3, wherein the magazine body is attached to a swing unit configured to be slidable both back-and-forth and right-and-left.

8. The electrode tip magazine for a spot welder according to claim 1, wherein the wire is directly connected between the distal end of the spiral spring and the push-out member.

* * * * *